United States Patent Office 2,830,035
Patented Apr. 8, 1958

2,830,035

HEAT-HARDENABLE AMINOPLAST RESIN MOLDING COMPOSITIONS, THEIR MANUFACTURE AND MOLDED ARTICLES THEREFROM

Alfred Renner and Gustav Widmer, Basel, Switzerland, assignors to Ciba Limited, Basel, Switzerland, a Swiss firm No Drawing. Application July 21, 1955
Serial No. 523,606
Claims priority, application Switzerland July 22, 1954
11 Claims. (Cl. 260—67.6)

Heat-hardenable aminoplast resin molding compositions are usually made as follows:

A solution of the aminoplast resin is mixed with a filling material, for example, cellulose, and the mixture is dried in a current of hot air and then broken into aggregates suitable for grinding. Into the resulting resin powder containing the filling material there are incorporated in a ball mill dyestuffs or pigments, the mold lubricant and also the hardening catalyst. The molding powder so obtained is either molded as such or previously compressed by known methods.

In preparing such molding compositions there are used latent hardening catalysts, that is to say, neutral, weakly basic or weakly acid substances, which, when heated, for example, under molding conditions, are capable of forming or splitting off acid so as to accelerate the hardening of the resin. Such substances must under conditions of storage be sufficiently stable and liberate substantially no acid which would lead to premature hardening and impair the capacity of the molding composition to flow. However, most of the latent hardening catalysts hitherto used do not adequately fulfil the requirements, on the one hand, of developing sufficient acidity under the molding conditions and, on the other, of not reducing the flowing capacity of the molding composition during storage either at all or only to an unimportant extent.

The present invention provides a process for the manufacture of heat-hardenable aminoplast resin molding compositions containing a latent hardening catalyst, wherein there is incorporated with the moist resin at any stage before the drying operation as the latent hardening catalyst a polyester of a benzene monosulfonic acid containing one or two methyl groups as substituents in the benzene nucleus with a polyhydric aliphatic alcohol.

In the following description and in the claims the expression "heat-hardenable aminoplast resin" has the meaning customarily understood in the art. It includes above all condensation products of aldehydes, especially formaldehyde, with compounds containing —NH₂ groups, which are capable of forming hardenable resins with formaldehyde, such as urea, thiourea or aminotriazines, which, like melamine, benzoguanamine and acetoguanamine, contain at least two —NH₂ groups bound directly to the triazine ring.

As benzene monosulfonic acids containing one or two methyl groups as substituents in the benzene nucleus there may be used the several toluene or xylene monosulfonic acids and mixtures thereof, especially para- or orthotoluene monosulfonic acid or mixtures thereof.

As polyhydric aliphatic alcohols to be esterified with the aforesaid substituted benzene sulfonic acids there come into consideration, more especially, dihydric or higher polyhydric, advantageously diprimary alcohols, for example, glycol, glycerine, butane-diol-(1:4), hexane-diol-(1:6), hexane-triol and decane-diol-(1:10). There are also suitable polyhydric, especially dihydric, aliphatic alcohols of which the carbon chain is interrupted by —O— or

for example, diethylene glycol, triethylene glycol, N-acylated diethanolamines and other N-acylated dialkanolamines. Mixtures of these alcohols may also be used. It will be understood that it is of advantage to select alcohols which yield sulfonic acid esters which are readily compatible with the aminoplast resin used. Thus, it is of advantage to use polyhydric, especially dihydric alcohols having a chain of 2–10 members.

The esterification of the polyhydric alcohols with the sulfonic acids may be carried out in known manner with the corresponding sulfochloride and caustic soda solution by the so-called Schotten-Baumann reaction. Non-acylated dialkanolamines may be used, if the sulfochloride is used in a proportion sufficient for the simultaneous acylation of the —NH— group.

The catalysts may be used in a proportion within the range of 0.1 to 5 percent, and advantageously 1–2 percent, calculated on the weight of the finished dry molding composition.

In making the pressure molding compositions by the process of this invention it is important that the latent hardening catalyst should not, as hitherto usual, be incorporated by rolling into the solid dried powdered product containing filling material, and that it should be incorporated in the moist resin at any stage before the drying operation, for example, when the resin solution is kneaded with the cellulose. The hardening catalyst dispersed in the resin in this manner is substantially more active than the catalyst incorporated in the same concentration by rolling. The kneaded mass obtained as described above can be dried without the use of reduced pressure at temperatures in the region of 100° C. even for long periods, without the risk of substantial decomposition of the catalysts used in this invention, and therefore without premature hardening and loss of flow capacity. Such a drying procedure is hardly possible with the latent hardening catalysts hitherto used, owing to their insufficient stability.

Filling materials, such as cellulose, cotton linters, waste textile material, wood meal, asbestos and other known organic or inorganic filling materials, and also mold lubricants, dyestuffs, pigments and/or other known modifying agents may be incorporated in the moist resin simultaneously with the hardening catalyst. In this manner it is possible by drying the kneaded product and disintegrating it to a suitable grain size to produce finished granulated molding compositions in a simple manner.

The molded compositions made in accordance with the present process have a substantially higher speed of hardening coupled with better stability during storage than those containing the catalysts customarily used, and also possess an excellent flow capacity even when they have been dried to remove the free water almost completely. It has been found that a few of the hardening catalysts used in the present process, for example, 1:4-di-para-toluene-sulfoxy-n-butane and 2:2'-di-para-toluene-sulfoxy-diethyl ether, possess the property of substantially lightening the natural color of the uncolored molding compositions.

The following examples illustrate the invention, the parts, percentages and parts per mil being by weight:

Example 1

1400 parts of an aqueous resin solution having a resin content of about 40 percent, and prepared in known manner by condensing melamine with formaldehyde in the molecular ratio 1:2 under weakly alkaline conditions, are kneaded with 400 parts of cellulose (100 percent strength) from beech wood, 15 parts of 2:2'-di-para-toluene-sulfoxy-diethyl ether and 5 parts of zinc stearate at 50° C. After drying the mass at 90° C., it is given a preliminary disintegration and then ground in a ball mill with the desired dyestuffs and pigments.

There is obtained a molding composition which flows easily, hardens rapidly and has a good stability during storage. Molded articles made therefrom have a good gloss and an excellent resistance to cold and boiling water and also to boiling alkaline or acid solutions. The speed of hardening was determined by molding test rods measuring 4 x 10 x 120 millimetres at 150° C., and determining, for different pressing times, their impact bending strength, bending strength and water absorption (10 minutes in boiling water). The capacity of small plates, which were likewise molded at 150° C., to become colored was tested by boiling them for 10 minutes in an aqueous solution containing 0.25 per mil of Kiton Fast Red BLE and 0.8 percent of $H_2SO_4$. The results are given in the following table:

| Molding time at 150° C. in minutes | Bending strength, kg./mm.² | Impact bending strength, kg./cm. | Water absorption, 10 minutes at 100° C., percent | Degree of coloring |
|---|---|---|---|---|
| 1 | 9.9 | 4.8 | 0.23 | moderate. |
| 2 | 9.9 | 4.4 | 0.15 | hardly any. |
| 3 | 8.9 | 5.2 | 0.16 | none. |

In a storage test at 60° C. for 24 hours the test samples showed no appreciable change in flow capacity.

The 2:2'-di-para-toluene-sulfoxy-diethyl ether can be prepared in known manner as follows: In a 3-necked flask fitted with a stirring means, thermometer and dropping funnel 190 parts of para-toluene sulfochloride are stirred well with 70 parts of diethylene glycol. While cooling well externally, 137.5 parts by volume of an aqueous solution of caustic soda of 25 percent strength is run in in such manner that the temperature remains between 0° C. and 5° C. When the addition is complete, the mixture is stirred for a further 3 hours, then diluted with 500 parts by volume of water, and the precipitate is filtered off with suction and washed with 500 parts by volume of water. The reaction product is dried well by suction, then recrystallized from 500 parts by volume of methyl alcohol, if desired with the addition of a small amount of animal carbon and dried at 60° C.

With the same success there may be used a catalyst prepared from a commercial mixture of para- and ortho-toluene sulfochlorides.

Similar results are obtained, in this example, if instead of 15 parts of 2:2'-para-toluene-sulfoxy-diethyl ether, 20 parts of 1:6-di-para-toluene-sulfoxy-n-hexane or 26 parts of 1:10-di-para-toluene-sulfoxy-n-decane are used.

Example 2

1600 parts of an aqueous resin solution having a resin content of about 57–58 percent, and prepared in known manner by condensing urea with formaldehyde in the molecular ratio 1:1.5, are kneaded with 425 parts of α-cellulose flocks (100 percent) and 15.3 parts of 1:4-di-para-toluene-sulfoxy-n-butane. The kneaded product is dried in a current of hot air at 100° C. until its content of free water is less than 1 percent. The product is given a preliminary disintegration, and ground in a ball mill with a mold lubricant and the desired dyestuffs and pigments.

There is obtained a molding composition which flows easily, hardens rapidly and has an excellent stability during storage. Molded articles made therefrom have a beautiful gloss and good resistance to boiling and cold water. The hardening speed and stability during storage were determined as described in the preceding example. The capacity of small plates, which have been molded at 150° C. to become colored was tested by boiling them for 10 minutes in a solution containing 0.25 per mil of Kiton Fast Red BLE in water. The results are given in the following table:

| Molding time at 150° C. in minutes | Bending strength, kg./mm.² | Impact bending strength, kg./cm. | Water absorption, 10 minutes at 100° C., percent | Degree of coloring |
|---|---|---|---|---|
| 1 | 11.3 | 6.6 | 1.7 | very slight. |
| 2 | 10.0 | 6.5 | 1.05 | none. |
| 3 | 11.8 | 7.0 | 0.95 | Do. |

In order to determine the stability during storage the test portion of the molding powder was subjected for 24 hours in a closed vessel to a temperature of 60° C. The flow capacity was not appreciably impaired. A molding composition, which withstands this test, can be stored for at least one year at room temperature without any marked loss in its flow capacity or impairment of its capacity for being molded.

The 1:4-di-para-toluene-sulfoxy-n-butane is obtained in a manner analogous to that described in Example 1 for 2:2'-di-para-toluene-sulfoxy-diethyl ether, by reacting 190 parts of para-toluene sulfochloride with 60 parts of butane-diol-(1:4) and 137.5 parts by volume of an aqueous solution of caustic soda of 25 percent strength.

Instead of 15.3 parts of 1:4-di-para-toluene-sulfoxy-n-butane, there may be used in this example with substantially the same success 16 parts of 1:2-di-para-toluene-sulfoxy-ethane, 15 parts of 1:3-di-para-toluene-sulfoxy-propanol-(2) or 24 parts of triethylene glycol di-para-toluene sulfonate.

Example 3

1600 parts of the resin solution described in Example 2 are kneaded with 425 parts of α-cellulose flocks (100 percent) and 15.3 parts of 1:4-di-para-toluene-sulfoxy-n-butane, and with the addition of 6.3 parts of zinc stearate and 12.3 parts of lithopone. The kneaded product is dried at 100° C., and disintegrated in a suitable mill to a grain size of about 0.1 to 1 mm. diameter. There is obtained a granulated molding composition having an apparent density of 750 grams per cubic decimetre, which possesses good properties similar to those of the product of Example 2.

Instead of 15.3 parts of di-para-toluene sulfoxy-n-butane, there may be used in this example with substantially the same success 32 parts of N-para-toluene sulfonyl-(2:2'-di-para-toluene-sulfoxy - diethylamine) or 30 parts of N-benzoyl-(2:2'-di-para-toluene-sulfoxy-diethylamine).

Example 4

280 parts of benzoguanamine and 283 parts of melamine are dissolved at the boiling temperature in 600 parts of formaldehyde solution of 30 percent strength and 50 parts of water to give a pH value of 9.0. After cooling the solution to 70° C., it is filtered, and then condensation is carried out at 80° C. at a pH value of 9.0 until 1 part by volume of the resin solution becomes turbid on the addition of 4 parts by volume of ethanol at 20° C.

310 parts of α-cellulose, 1100 parts of the above resin solution, 13 parts of a diester from commercial hexane-triol (consisting mainly of 3-methylol-2:4-pentane-diol) and 2:4-xylenemonosulfochloride and 4.75 parts of zinc stearate are mixed together in a kneading machine for 30 minutes at 50° C. After drying the mixture for one hour in a current of air at 90° C., the resulting granular mass is given a preliminary disintegration, and then ground in a ball mill together with the desired dyestuffs and pigments.

There is obtained a molding composition having a very good flow capacity and stability to storage. Molded articles made therefrom have a handsome appearance and gloss, and an excellent resistance to cold and boiling water and also to acid and alkaline solutions. They also possess an excellent resistance to foodstuffs which can cause coloration, such as coffee, tea, jams, red wine, etc., so that this dressing composition can be used very well for the manufacture of vessels.

When tested in the manner described in Example 1 this molding composition gave the following results:

| Molding time at 150° C. in minutes | Bending strength, kg./mm.² | Impact bending strength, kg./cm. | Water absorption, 10 minutes at 100° C., percent | Degree of coloring |
|---|---|---|---|---|
| 1 | | | 0.15 | moderate. |
| 2 | 10.5 | 4.0 | 0.25 | slight. |
| 3 | 10.0 | 4.4 | 0.25 | none. |

The flow capacity of the molding composition did not change after storage for 24 hours at 60° C.

Instead of the catalyst used in this example, there may be used with substantially the same success 10 parts of 1:4-di-ortho-toluene-sulfoxy-n-butane.

What we claim is:

1. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 0.1 to 5 percent on the weight of the finished dry molding composition, a diester consisting of a benzene monosulfonic acid containing one to two methyl groups as substituents in the benzene nucleus with a polyhydric aliphatic diprimary alcohol containing 2 to 10 carbon atoms.

2. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 0.1 to 5 percent on the weight of the finished dry molding composition, a diester consisting of a toluene monosulfonic acid with a polyhydric aliphatic diprimary alcohol containing 2 to 10 carbon atoms.

3. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 0.1 to 5 percent on the weight of the finished dry molding composition, a diester consisting of a benzene monosulfonic acid containing one to two methyl groups as substituents in the benzene nucleus with a dihydric aliphatic diprimary alcohol containing 2 to 10 carbon atoms.

4. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 1 to 2 percent on the weight of the finished dry molding composition, a diester consisting of a toluene monosulfonic acid with a dihydric aliphatic diprimary alcohol containing 2 to 10 carbon atoms.

5. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 1 to 2 percent on the weight of the finished dry molding composition, 1:4-di-para-toluene-sulfoxy-n-butane.

6. Heat-hardenable aminoplast resin molding composition comprising a heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, and, as a latent hardening catalyst in an amount of 1 to 2 percent on the weight of the finished dry molding composition, 2:2'-di-para-toluene sulfoxy-diethyl ether.

7. A process for the manufacture of a heat-hardenable aminoplast resin molding composition, wherein there is incorporated in a moist heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring at any stage before the drying operation as a latent hardening agent a diester consisting of a benzene monosulfonic acid containing one to two methyl groups as substituents in the benzene nucleus with a polyhydric aliphatic diprimary alcohol containing 2 to 10 carbon atoms, the proportion of said catalyst being within the range of 0.1 to 5 percent on the weight of the finished dry molding composition.

8. A process for the manufacture of a heat-hardenable aminoplast resin molding composition, wherein there is incorporated in a moist heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring, at any stage before the drying operation as a latent hardening agent a diester consisting of a toluene monosulfonic acid with a polyhydric aliphatic diprimary alcohol containing 2 to 10 carbon atoms, the proportion of said catalyst being within the range of 0.1 to 5 percent on the weight of the finished dry molding composition.

9. A process for the manufacture of a heat-hardenable aminoplast resin molding composition, wherein there is incorporated in a moist heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring at any stage before the drying operation as a latent hardening agent a diester consisting of a benzene monosulfonic acid containing one to two methyl groups as substituents in the benzene nucleus with a polyhydric aliphatic diprimary alcohol containing 2 to 10 carbon atoms, the proportion of said catalyst being within the range of 1 to 2 percent on the weight of the finished dry molding composition.

10. A process for the manufacture of a heat-hardenable aminoplast resin molding composition, wherein there is incorporated in a moist heat-hardenable aminoplast resin selected from the group consisting of urea-formaldehyde condensation products, thiourea-formaldehyde condensation products and condensation products of formaldehyde with aminotriazines containing at least two —NH₂ groups bound directly to the triazine ring at any stage before the drying operation as a latent hardening agent a diester consisting of a toluene monosulfonic acid with a polyhydric aliphatic diprimary alcohol containing 2 to 10 carbon atoms, the proportion of said catalyst being within the range of 1 to 2 percent on the weight of the finished dry molding composition.

11. A molded article consisting of the cured composition as claimed in claim 1.

References Cited in the file of this patent

UNITED STATES PATENTS

| | | |
|---|---|---|
| 1,924,396 | Carswell | Aug. 29, 1933 |
| 2,469,157 | Cordier | May 3, 1949 |